Patented Sept. 27, 1932

1,879,540

UNITED STATES PATENT OFFICE

WERNER SCHULEMANN, OF VOHWINKEL, NEAR ELBERFELD, FRITZ MIETZSCH, OF ELBERFELD, GERMANY, AND AUGUST WINGLER, OF WESTFIELD, NEW JERSEY, ASSIGNORS TO WINTHROP CHEMICAL COMPANY, INC., OF NEW YORK, N. Y., A CORPORATION OF NEW YORK

COMPOUNDS OF THE DIAZINE SERIES

No Drawing. Application filed November 15, 1929, Serial No. 407,557, and in Germany September 11, 1924.

The present invention relates to new compounds of the azine series, more particularly it relates to azines, being at least once substituted in the benzene nuclei by a substituent of the general formula:

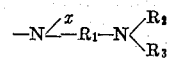

wherein $x$ stands for hydrogen, or, for example, an alkyl group, an aminoalkyl group, or substituted aminoalkyl group, such as a mono alkylaminoalkyl group or dialkylaminoalkyl group, $R_1$ stands for an alkylene residue, in which the hydrogen atoms may be replaced by monovalent substitutents, for example, by the hydroxy group, $R_2$ and $R_3$ stand for alkyl groups which may be substituted, for example, by an amino group, and wherein the azine nucleus may be further substituted, for example, by alkyl, alkoxy, phenyl, halogen and the like.

The manufacture of our new compounds can be effected in several ways; for instance an amino derivative of an azine may be caused to be acted upon by an aminoalkyl halide having the general formula:

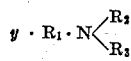

wherein $y$ represents a halogen atom, $R_1$ an alkylene residue the hydrogen atoms of which may be replaced by a monovalent substitutent, such as the hydroxy group, $R_2$ and $R_3$ stand for hydrogen or alkyl groups which may be substituted, for example, by amino groups.

Instead of the aminoalkyl halide one may use in this process the salt of an aminoalkyl halide with an inorganic acid or a substitution product of the aminoalkyl halide, such as the bromoethylphthalimide. In the last case phthalic acid is to be split off subsequently.

The manufacture of our new compounds can be furthermore effected by converting such amino compounds as are suitable intermediate products for the manufacture of amino derivatives of the azine into aminoalkylamino derivatives and subsequently transforming the latter into the corresponding azine compounds according to known methods. We are aware of the fact that several other methods for preparing our new compounds are obvious which, however, we do not mention specifically.

The new azine derivatives are generally yellow to violet products of a low melting point, generally sparingly soluble in water, soluble in organic solvents; they yield, with inorganic acids, water-soluble violet colored salts, and are pharmaceutically valuable products.

The following examples illustrate our invention, without restricting it thereto:

Example 1

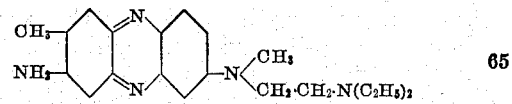

N-(methyl-diethylaminoethyl)-aminobenzene is prepared as follows: 100 parts by weight of monomethylaniline are heated under reflux for 24 hours with 135 parts by weight of diethylaminoethylchloride in a solution of 250 parts by weight of dry benzene. The hydrochloride of N-(methyl-diethylamino-ethyl)-aminobenzene thus produced is filtered off, washed with some benzene and dissolved in water; the free base is separated with potassium carbonate. For the purpose of eliminating any quaternary ammonium compound, which may likewise have been salted out, the free base is dissolved in some benzene. After drying with potassium carbonate it distils as a colorless liquid at 124–126° C. (under 5 mm. pressure) after the separation of a slight preliminary fraction. Preparation of the azine compound 20.6 grams of N-(methyl-diethylaminoethyl)-aminobenzene are dissolved in 20 cc. of concentrated hydrochloric acid with the addition of water and while cooling. Thereupon ice is added to the mixture and a concentrated solution of 7.2 grams of sodium nitrite is introduced at 0° C., in order to produce the nitroso-compound. Finally an aqueous solution of 12.2 grams of 2.4-diaminotoluene diamine is added and the temperature is slowly increased to 80–90° C., whereby the solution gradually assumes the pure blue color of toluylene blue. After further heating for about half an hour the intensive blue color changes to a weak wine-red color due to the formation of the leuco compound of the azine dyestuff. The reddish violet dyestuff of the above constitution is obtained by oxidation of the leuco compound with ferric chloride in the cold and salting out with a common salt solution; it can be purified by redissolving and again salting out.

*Example 2*

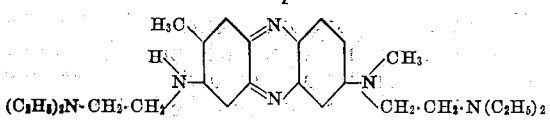

150 grams of 4-nitro-2-toluidine are quickly heated in 150 grams of xylene with 150 grams of diethylaminoethylchloride in an oil bath to about 140° C. and kept at this temperature for several hours while stirring. To the cooled mixture water and ether are added and thus an aqueous solution of the hydrochloric acid salt of 1-methyl-2-diethylaminoethylamino-4-nitrobenzene is obtained, while some starting material, eventually present, is dissolved in the ether-xylene layer. The new base is set free by the addition of potassium carbonate; it is extracted with ether, dried, the ether is distilled off and the new base is obtained as a thinly liquid bloody red oil having a boiling point of 176° C. under a pressure of 1.5 mm.

50 grams of iron borings are corroded with diluted aqueous acetic acid, while boiling, and 50 grams of the above new base, dissolved in the calculated amount of normal hydrochloric acid, are slowly introduced. The red solution is quickly decolorized. When the reduction is complete, the solution is filtered, rendered alkaline, and the reduction product is extracted with ether. The 1-methyl-2-diethylaminoethylamino-4-aminobenzene obtained is a colorless oil having a boiling point of 163° C. under a pressure of 1 mm.

The formation of the dyestuff of the above formula is effected as described in Example 1, by substituting 12.2 grams of 2-4-diaminotoluene by 22.1 grams of the new base. The dyestuff is similar to that described in Example 1.

This application is a continuation in part of our application Ser. No. 52,228, filed August 24, 1925, (U. S. Patent No. 1,766,403).

We claim:

1. As new products, the azine compounds of the probable general formula:

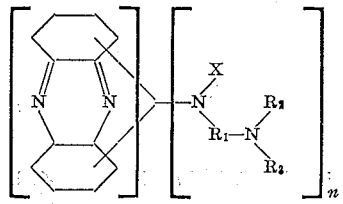

wherein X stands for hydrogen or methyl, $R_1$ stands for an ethylene radical which may be substituted by the hydroxyl group, $R_2$ and $R_3$ stand for the ethyl group which may be substituted by an amino group, and "$n$" stands for one of the numbers one and two, and wherein the nuclei may be further substituted by a substituent of the group consisting of methyl, methoxy, phenyl, halogen and the amino group.

2. As a new product, the azine compound of the following formula:

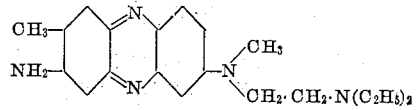

being in the form of its mineral acid salts a bronze colored powder, easily soluble in water with a violet coloration.

3. As new products, the azine compounds of the probable general formula:

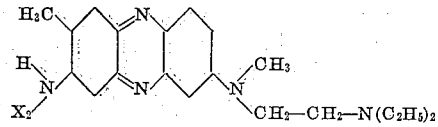

wherein $X_2$ stands for hydrogen or the radical $-CH_2-CH_2-N(C_2H_5)_2$, said compounds being in the form of their mineral acid salts soluble in water.

4. As a new product, the azine compound of the formula:

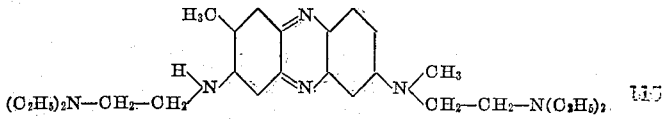

being in the form of its mineral acid salts easily soluble in water.

In testimony whereof, we hereunto set our hands and affix our seals.

WERNER SCHULEMANN. [L. S.]
FRITZ MIETZSCH. [L. S.]
AUGUST WINGLER. [L. S.]